(12) United States Patent
Fidan et al.

(10) Patent No.: US 8,056,968 B2
(45) Date of Patent: Nov. 15, 2011

(54) DEVICE FOR GUIDING THE MOVEMENT OF A WIND DEFLECTOR

(75) Inventors: Serkan Fidan, Sindelfingen (DE); Bernd Plocher, Rottenburg (DE)

(73) Assignee: Daimler AG, Stuttgart (DE)

( * ) Notice: Subject to any disclaimer, the term of this patent is extended or adjusted under 35 U.S.C. 154(b) by 0 days.

(21) Appl. No.: 12/301,395

(22) PCT Filed: Apr. 26, 2007

(86) PCT No.: PCT/EP2007/003670
§ 371 (c)(1),
(2), (4) Date: Mar. 16, 2010

(87) PCT Pub. No.: WO2007/134694
PCT Pub. Date: Nov. 29, 2007

(65) Prior Publication Data
US 2010/0164254 A1    Jul. 1, 2010

(30) Foreign Application Priority Data
May 19, 2006 (DE) .......................... 10 2006 023 911

(51) Int. Cl.
*B60J 7/22* (2006.01)
(52) U.S. Cl. ....................................................... 296/217
(58) Field of Classification Search .................. 296/217
See application file for complete search history.

(56) References Cited

U.S. PATENT DOCUMENTS

| 4,492,406 | A | 1/1985 | Matsubara | |
|---|---|---|---|---|
| 6,669,277 | B2 * | 12/2003 | Farber et al. | 296/217 |

FOREIGN PATENT DOCUMENTS

| DE | 37 43 476 A1 | 7/1988 |
|---|---|---|
| DE | 38 33 046 A1 | 4/1990 |
| DE | 196 03 670 C1 | 4/1997 |
| DE | 102 17 659 A1 | 11/2003 |
| DE | 10 2004 027 087 A1 | 12/2005 |
| DE | 10 2004 030 804 B3 | 1/2006 |
| DE | 10 2004 052 715 A1 | 5/2006 |
| EP | 0 895 889 A2 | 2/1999 |
| GB | 2 199 797 A | 7/1988 |
| JP | 53-30527 A1 | 3/1978 |
| JP | 59-124432 A1 | 7/1984 |

OTHER PUBLICATIONS

International Search Report dated Jul. 25, 2007 w/English translation (six (6) pages).

* cited by examiner

*Primary Examiner* — Dennis Pedder
(74) *Attorney, Agent, or Firm* — Crowell & Moring LLP

(57) ABSTRACT

A device is provided for guiding a movement of a bar-type wind deflector in relation to a roof frame in a region between a position of use and a position of non-use, especially on a cabriolet. At least one pair of rotary levers is provided on the wind deflector. The rotary levers are mounted on the wind deflector at a first rotary lever end such that they can rotate about a first rotational axis, and on the roof frame at a second rotary lever end such that they can rotate about a second rotational axis, the rotational axes being parallel to each other. The rotary levers of each pair are staggered in relation to each other at least in the direction of a normal of one of the rotational axes. The rotational axes of each pair form the vertexes of a parallelogram.

3 Claims, 2 Drawing Sheets

DEVICE FOR GUIDING THE MOVEMENT OF A WIND DEFLECTOR

CROSS-REFERENCE TO RELATED APPLICATIONS

This application is a U.S. National Phase of PCT International Application No. PCT/EP2007/003670, filed on Apr. 26, 2007, which claims priority under 35 U.S.C. §119 to German Application No. 10 2006 023 911.3, filed May 19, 2006, the entire disclosures of which are expressly incorporated by reference herein.

BACKGROUND AND SUMMARY OF THE INVENTION

The invention relates to a device for guiding a movement of a lamellar wind deflector with respect to a roof frame in a range between a use position and a non-use position, in particular on a cabriolet.

To avoid air draft and turbulence, wind deflectors are often provided on cabriolets. To adapt to different operating conditions, for example driving with an open or closed top, said wind deflector may be designed to be adjustable between a use position at a maximum distance from a roof frame, for example the roof frame of a cabriolet, and a non-use position in the vicinity of the roof frame.

German Patent Publication No. 38 33 046 A1 describes a motor vehicle having a cabriolet top and a wind deflector, in which a wind deflector is arranged on a front roof cross-member and can be adjusted between a rest position and an operating position by means of a raising device. The adjustment takes place, however, in a pivoting movement, in which the angle of the wind guiding element varies, which is disadvantageous in terms of aerodynamics.

It is an object of the invention to specify an improved device for guiding a movement of a lamellar wind deflector with respect to a roof frame in a range between a use position and a non-use position.

For the device according to the invention for guiding a movement of a lamellar wind deflector with respect to a roof frame in a range between a use position and a non-use position, a rotary lever arrangement is provided which comprises at least one pair of rotary levers which are arranged so as to be offset with respect to one another in such a way as to form a parallelogram linkage.

In a simple embodiment, the rotary levers are rotatably mounted at a first rotary lever end on the wind deflector by in each case one first rotary axle. At a second rotary lever end, the rotary levers are rotatably mounted on the roof frame by in each case one second rotary axle. The roof frame may for example be the roof frame of a cabriolet. All the rotary axles lie parallel to one another. The rotary levers of the pair are arranged offset with respect to one another at least in the direction of a normal to one of the rotary axles. The cross-sectional area between the rotary axles of the pair forms a parallelogram with the rotary axles as corner points. Such an arrangement of the rotary axles permits a parallel movement of the wind deflector. The wind deflector is prevented from tilting since, in this way, the wind deflector itself is part of the parallelogram.

A plurality of pairs of rotary levers is preferably formed, such that, in cross section, their rotary axles form the corner points of in each case one parallelogram per pair. Here, a rotary lever may belong to a plurality of pairs. The resulting parallelograms may be in congruent alignment and/or may at least partially overlap one another when projected onto one another.

In order to be able to move the wind deflector not only manually, a drive is preferably provided at least on one of the rotary levers or its second rotary axle. In the case of three rotary levers, the rotary levers may for example be arranged equidistantly on the wind deflector, with a rotary lever which is arranged between the two other rotary levers being provided with a drive.

The drive of a rotary lever preferably takes place by means of a crank arm. A crank arm of said type may for example have a first crank arm end and a second crank arm end. At its first crank arm end, the crank arm is mounted so as to be rotatable about a crank arm axle which lies substantially parallel to the rotary axles and which is arranged on the roof frame. At its second crank arm end, the crank arm has a rotationally symmetrical pin which engages into a slot or a groove which is provided on the driven rotary lever. Such a drive is suitable in particular for converting a rotational movement for example of an electric motor, which drives the crank arm, into a rectilinear movement, such as is to be performed by the wind deflector.

The wind deflector preferably has a use position at a maximum distance from the roof frame and a non-use position close to the roof frame, in which positions said wind deflector can be latched or locked. Such a latching action may take place by retaining clamps or similar devices which require an increased expenditure of force in order to leave the respective position. In the use position in particular, the latching may take place by virtue of the crank arm being perpendicular to the slot or groove, such that the linkage composed of the rotary lever and crank arm is self-locking. It is also possible, for example in the non-use position, for end-position locking of at least one rotary lever to take place by means of spring-loaded bolts which are controlled by a Bowden cable which is actuated for example by means of an idle stroke of the crank arm which is situated in the non-use position.

In a particularly preferred embodiment, two rotary levers, which are offset with respect to one another only in the direction of the rotary axles, are arranged in the vicinity of in each case one end of the wind deflector. Furthermore, a driven rotary lever is arranged in a central region of the wind deflector and is offset with respect to the two rotary levers in the direction of a normal to one of the rotary axles. Each of the two rotary levers, which are arranged at the ends, forms a pair with the driven rotary lever. Here, the parallelograms of the pairs fully overlap one another in the viewing direction of the rotary axles. In this way, the arrangement is made highly stable against twisting, which would occur with the use of a total of only two rotary levers if these were arranged at a large distance from one another on the wind deflector.

The use of two driven rotary levers in the central region of the wind deflector, which two driven rotary levers are offset with respect to one another only in the direction of the rotary axles, additionally improves stability. The drive of the rotary levers may take place together, for example by a common second rotary axle or by means of crank arms which are connected to one another.

The wind deflector may be curved in order to follow a predefined shape of the roof frame. Both a sickle-shaped curvature over an edge of the wind deflector and also a curvature or arching of the surface of the wind deflector or a combination of these are possible. The desired offset of the rotary levers in the region of the ends with respect to those in the central region is facilitated in both cases.

To prevent air turbulence, it may be advantageous to arrange a fine-mesh fabric between the wind deflector and the roof frame.

Said fine-mesh fabric may preferably be rolled up in the manner of a roller blind on the wind deflector or on the roof frame, such that said fabric is not in the way or trapped when the wind deflector is moved into the non-use position.

Other objects, advantages and novel features of the present invention will become apparent from the following detailed description of one or more preferred embodiments when considered in conjunction with the accompanying drawings.

BRIEF DESCRIPTION OF THE DRAWINGS

Corresponding parts are provided with the same reference symbols in all the figures.

DETAILED DESCRIPTION

Figure 1:
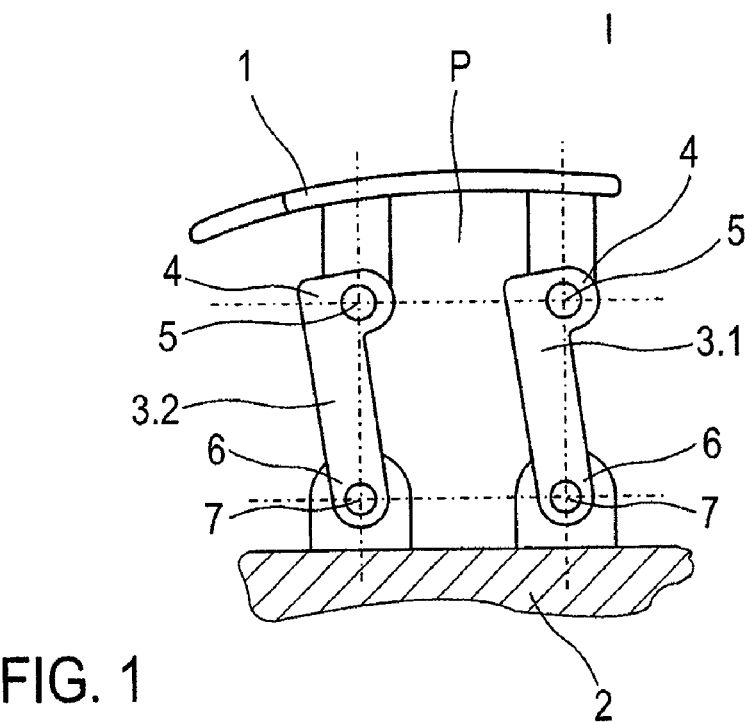
FIG. 1 shows a side view of a device for guiding the movement of a lamellar wind deflector which is in a use position according to an embodiment of the present invention.

FIG. 1 shows a side view of a device for guiding a movement of a lamellar wind deflector 1 with respect to a roof frame 2, with the wind deflector 1 being in a use position I at a maximum distance from the roof frame 2. The wind deflector 1 is convexly curved at its edge which is situated at the left in the drawing. The roof frame 2 may be the roof frame of a cabriolet.

A rotary lever arrangement which comprises a pair of rotary levers 3.1, 3.2 can be seen on the wind deflector 1 between the latter and the roof frame 2, with the rotary levers 3.1, 3.2 being rotatably mounted on the wind deflector 1 at a first rotary lever end 4 by means of in each case one first rotary axle 5.

At a second rotary lever end 6, the rotary levers 3.1, 3.2 are rotatably mounted on the roof frame 2 by in each case one second rotary axle 7. All the rotary axles lie parallel to one another. The rotary levers 3.1, 3.2 of the pair are arranged offset with respect to one another in the direction of a normal to one of the rotary axles 5 and 7. Furthermore, the rotary levers 3.1, 3.2 are axially offset, such that the right-hand rotary lever 3.1 is arranged at one end of the wind deflector 1 and the left-hand rotary lever 3.2 is arranged in a central region of the wind deflector 1.

The rotary axles 5, 7 of the pair form the corner points of a parallelogram P.

A further rotary lever 3.1 is arranged at another end of the wind deflector 1 in such a way that said further rotary lever 3.1 is merely axially offset with respect to the right-hand rotary lever 3.1 (not shown, as hidden by the right-hand rotary lever 3.1). A parallelogram formed by the further rotary lever 3.1 with the left-hand rotary lever 3.2 therefore fully overlaps the parallelogram P which is shown.

The rotary levers 3.1 and 3.2 which are arranged between the wind deflector 1 and the roof frame 2 therefore form a parallelogram linkage for controlling the movement of the wind deflector 1. Such an arrangement of the rotary levers 3.1 and 3.2 and their rotary axles 5, 7 permits a parallel movement of the wind deflector 1. The wind deflector 1 is prevented from tilting about a longitudinal axis since, in this way, the wind deflector 1 forms a side of the parallelogram P. The rotary lever 3.2 is preferably driven, for example by a crank arm (not shown).

Figure 2:
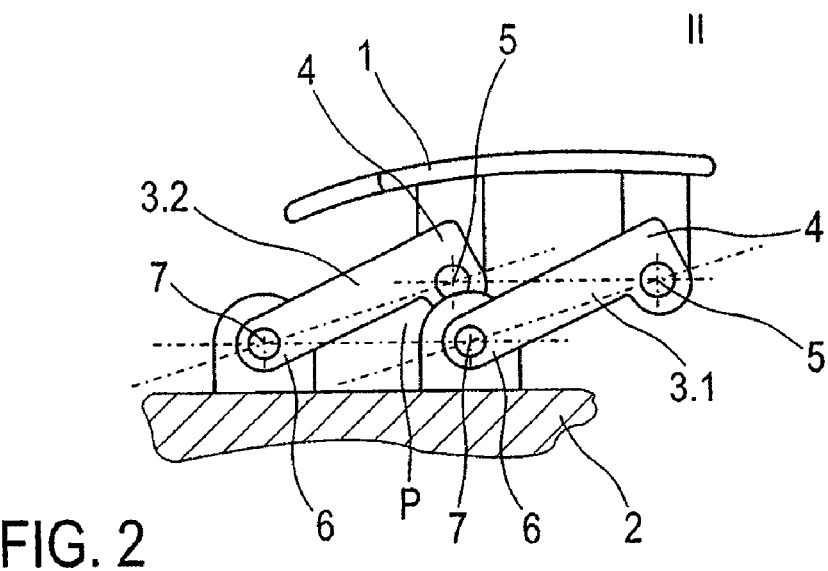
FIG. 2 shows a side view of a device for guiding a movement of a lamellar wind deflector which is in a non-use position according to an embodiment of the present invention.

FIG. 2 shows a side view of the device for guiding the movement of the lamellar wind deflector 1 with respect to the roof frame 2 from FIG. 1, with the wind deflector 1 being in a non-use position II in the vicinity of the roof frame 2. For this purpose, the rotary levers 3.1, 3.2 have been pivoted clockwise.

Figure 3:
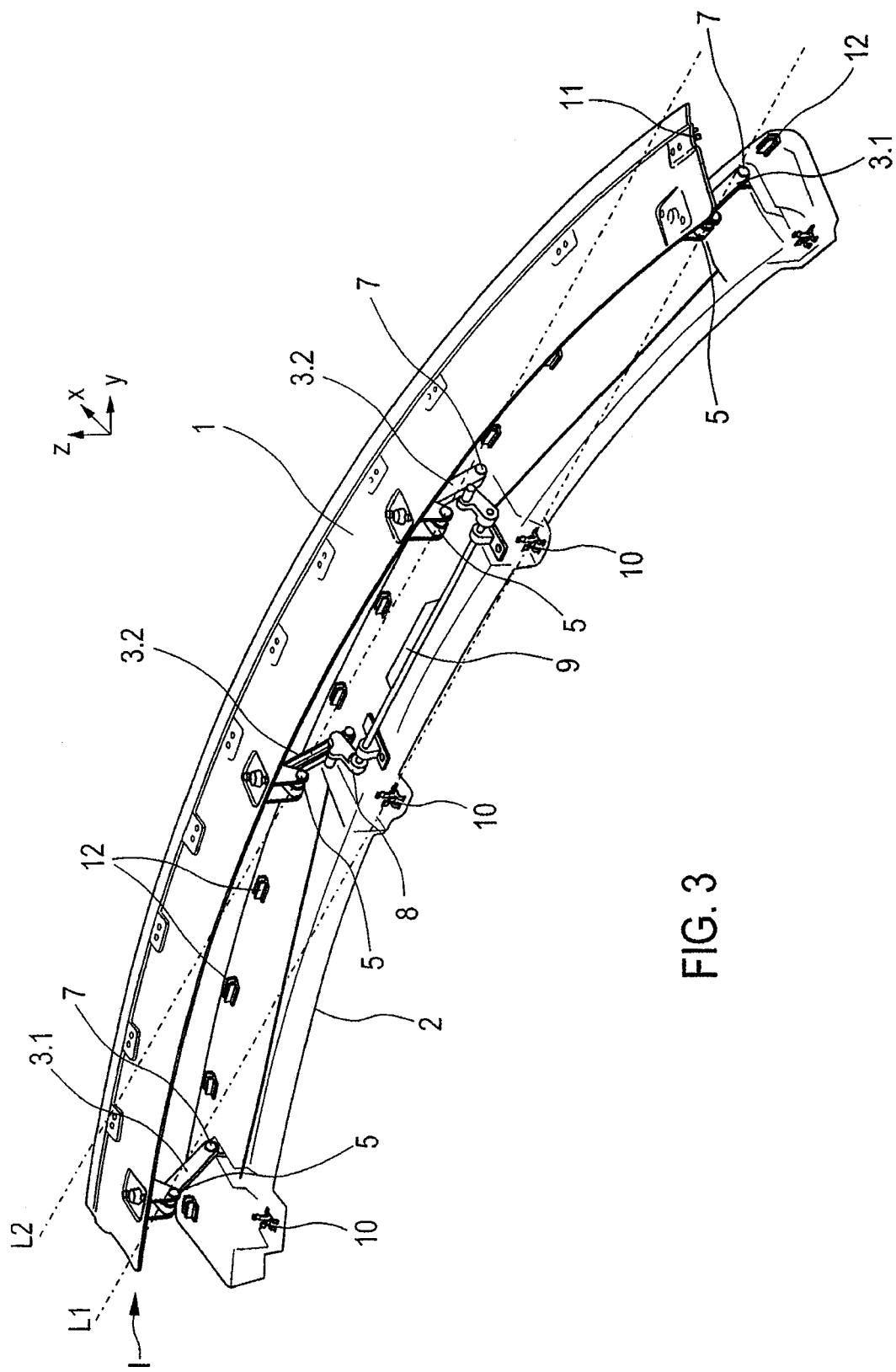
FIG. 3 shows a perspective view of a lamella, which serves as a wind deflector, with a device for adjusting the lamella according to an embodiment of the present invention.

FIG. 3 shows a perspective view of a lamellar wind deflector 1 with a device for guiding a movement of a lamellar wind deflector 1 with respect to a roof frame 2. The wind deflector 1 is situated in a use position I at a maximum distance from a roof frame 2.

The wind deflector 1 is curved about its edge which points rearward in the vehicle, and to the bottom left in the figure.

Four rotary levers 3.1, 3.2 are provided on the wind deflector 1, of which two rotary levers 3.1 are arranged in the vicinity of in each case one end of the wind deflector 1, and of which two rotary levers 3.2 are arranged in a central region of the wind deflector 1.

The rotary levers 3.2 in the central region have a drive in the form of crank arms 8 with a common crank arm axle 9. The rotary levers 3.1 in the vicinity of the ends of the wind deflector 1 are not driven in the exemplary embodiment shown.

The rotary levers 3.1 are offset with respect to one another only axially, but axially and radially with respect to the rotary levers 3.2, that is to say in the direction of a normal to one of the rotary axles 5, 7. The rotary levers 3.2 in turn are offset with respect to one another only axially, such that all the pairs of rotary levers 3.1, 3.2 which are formed lead to fully overlapping parallelograms, as shown in FIG. 1.

The first line L1, which connects the first rotary axles 5 of the rotary levers 3.1, and the second line L2, which connects the first rotary axles 5 of the rotary levers 3.2, show the radial offset of the rotary levers 3.1, 3.2.

Retaining clamps 10 are provided on the roof frame 2, into which retaining clamps the first rotary axles 5 slide when the wind deflector 1 is moved into a non-use position II in the vicinity of the roof frame 2. The wind deflector 1 is held there such that it does not inadvertently leave the non-use position II as a result of relative wind or other forces. Further retaining devices 11 are provided for this purpose on the front edge of the wind deflector 1, the counterparts 12 of which retaining devices 11 are arranged on the roof frame.

In order to fix the lamella in the non-use position II, it is possible for locking devices to be provided in particular on the rotary levers 3.1 but also on the rotary levers 3.2. A locking device preferably comprises, on each rotary lever 3.1, a spring-loaded bolt (not illustrated) which engages laterally in a suitable way into the rotary lever 3.1 in order to latch the latter. The bolt is actuated for example by a Bowden cable which is arranged on a crank arm 8 in such a way that the bolt latches the rotary lever 3.1 when the crank arm 8 is situated in the non-use position II and performs an idle stroke.

To prevent air turbulence, a fine-mesh fabric may be arranged between the wind deflector 1 and the roof frame 2.

Said fabric 2 may preferably be rolled up in the manner of a roller blind on the wind deflector 1 and/or on the roof frame 2, such that said fabric is not in the way or trapped when the wind deflector 1 is moved into the non-use position II.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A device for guiding a movement of a lamellar wind deflector with respect to a roof frame of a vehicle in a range between a use position and a non-use position, comprising
at least one pair of rotary levers, including a lever mounted near a center of the deflector and a lever mounted near an end of the deflector,
wherein
the at least one pair of rotary levers forms a rotary lever arrangement between the wind deflector and the roof frame,
the at least one pair of rotary levers is offset with respect to one another in an longitudinal direction of the vehicle and in a transverse direction of the vehicle such that when viewed in the transverse direction the rotary levers form a parallelogram linkage,
the rotary levers are each rotatably mounted at a first rotary lever end on the wind deflector by a first rotary axle, and at a second rotary lever end on the roof frame by a second rotary axle,
the rotary axles are parallel to one another,
the rotary lever near the center of the wind deflector has a drive coupled thereto by a crank arm, and
the wind deflector is latchable in a non-use position via retaining devices on the roof frame.

2. The device as claimed in claim 1, wherein
the at least one pair of rotary levers includes two pairs of rotary levers,
the parallelogram linkages of the two pairs of rotary levers fully overlap one another viewed in the transverse direction.

3. The device as claimed in claim 2, wherein the wind deflector is curved.

* * * * *